United States Patent
Goldfarb

(10) Patent No.: US 8,787,777 B2
(45) Date of Patent: Jul. 22, 2014

(54) CHANNEL DE-SKEWING FOR A COHERENT OPTICAL RECEIVER

(75) Inventor: Gilad Goldfarb, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 322 days.

(21) Appl. No.: 13/172,460

(22) Filed: Jun. 29, 2011

(65) Prior Publication Data

US 2013/0004158 A1    Jan. 3, 2013

(51) Int. Cl.
*H04B 10/00*       (2013.01)
(52) U.S. Cl.
USPC .......................................... 398/206; 398/209
(58) Field of Classification Search
CPC ................................................ H04L 25/03267
USPC .................................................. 398/206, 209
See application file for complete search history.

(56) References Cited

U.S. PATENT DOCUMENTS

| | | | | |
|---|---|---|---|---|
| 7,603,044 | B1 * | 10/2009 | Conroy et al. | 398/202 |
| 8,145,071 | B2 * | 3/2012 | Tanaka et al. | 398/209 |
| 2011/0318005 | A1 * | 12/2011 | Yoshihara | 398/45 |

* cited by examiner

*Primary Examiner* — Danny Leung
(74) *Attorney, Agent, or Firm* — David L. Soltz

(57) ABSTRACT

A system may receive a group of electrical signals from an optical receiver and via a group of channels; identify a first signal, as a reference signal, that is received via a first channel; and identify a second signal, as an orthogonal signal, that is received via a second channel, where the second signal may be orthogonal to the first signal. The system may further measure a group of skew values based on a difference in arrival times between one or more other signals, of the group of electrical signals, and the reference signal or the orthogonal signal; generate a group of de-skew values based on at least a portion of the skew values; and transmit the de-skew values, to the optical receiver, where transmitting the de-skew values allows the optical receiver to de-skew signals on the group of channels.

23 Claims, 7 Drawing Sheets

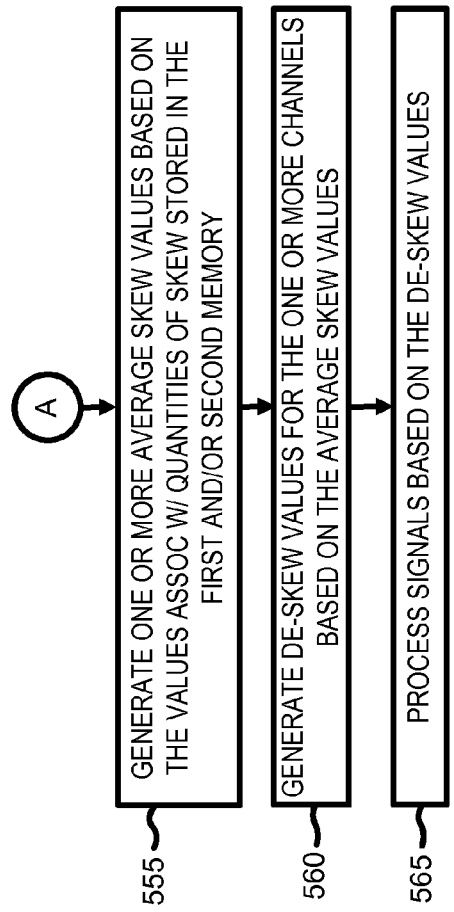

CHANNEL DE-SKEWING FOR A COHERENT OPTICAL RECEIVER

BACKGROUND

Coherent optical receivers process traffic, in the form of optical signals, received from an optical network. Coherent optical receivers process the optical signals by performing operations on the optical signals, such as polarization beam splitting, analogue-to-digital conversion, demodulation, etc. The processing often causes the optical signals to be deconstructed into constituent components, based on polarization (e.g., transverse electric (TE), transverse magnetic (TM), etc.), real and/or imaginary components (or alternatively, amplitude and phase components) wavelength, etc. The constituent components of the optical signals may be further processed by converting the components into electrical signals, by converting the electrical signals into digital signals, etc. The optical signals and/or electrical signals are typically processed and/or transported, within the coherent optical receiver, using different optical and/or electrical paths, respectively.

Coherent optical receivers may introduce timing skew (e.g., a time difference and/or delay) between components of an optical signal in the optical and/or electrical domain. The timing skew may be introduced as a result of polarization beam splitting, analog-to-digital conversion, etc. The timing skew may also be introduced by unequal optical and/or electrical path lengths used to transport and/or process each of the components of the optical signal.

SUMMARY

According to one implementation, a method, performed by a device, is provided. The method may include receiving a group of electrical signals from an optical receiver and via a group of channels; identifying a first signal, of the group of electrical signals, as a reference signal that is received via a first channel of the group of channels; and identifying a second signal, of the group electrical signals, as an orthogonal signal that is received via a second channel, of the group of channels, where the second signal may be orthogonal to the first signal. The method may further include measuring a group of skew values based on a difference in arrival times between one or more other electrical signals, of the group of electrical signals, and the reference signal or the orthogonal signal; generating a group of de-skew values based on at least a portion of the group of skew values; and transmitting the group of de-skew values, to the optical receiver, where transmitting the group of de-skew values allows the optical receiver to de-skew signals on the group of channels.

According to another implementation, a device may include one or more processors to receive a group of signals, from an optical receiver, via a group of channels; identify that a first signal, of the group of signals, is received via a first channel of the group of channels; and identify that a second signal, of the group electrical signals, is received via a second channel, of the group of channels, where the second signal may be orthogonal to the first signal. The device may also include the one or more processors to measure a group of skew values based on a difference in arrival times between one or more other signals of the group of signals and the first signal or the second signal; and generate a group of average skew values based on at least a portion of the group of skew values and at least a portion of a previously-measured group of skew values. The device may further include the one or more processors to generate a group of de-skew values based on the plurality of average skew values; and transmit the group of de-skew values to the optical receiver, where transmitting the group of de-skew values allows the optical receiver to de-skew the group of signals.

According to a further implementation, a system may include a de-skewing device to receive a group of electrical signals via a group of channels; identify a first signal, of the group of electrical signals, as a reference signal, that is received via a first channel of the group of channels; and identify that a second signal, of the group of electrical signals, is received via a second channel, of the group of channels, where the second signal may be orthogonal to the first signal. The system may also include the de-skewing device to generate one or more skew values that correspond to differences in arrival times between one or more other signals, of the group of electrical signals, and the first signal or the second signal; generate one or more de-skew values, associated with the group of channels, based on the one or more skew values and another one or more skew values that were previously generated; and output the one or more de-skew values. The systems may further include an optical receiver to receive the one or more de-skew values from the de-skewing device; and de-skew the group of channels using the one or more de-skew values.

BRIEF DESCRIPTION OF THE DRAWINGS

FIGS. 5A and 5B are flowcharts of an example process for performing a de-skewing operation according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods, described herein, may include a technique for determining one or more quantities of time skew (sometimes referred to herein as "skew") between channels of a coherent optical receiver. The term time skew, as used herein, may correspond to a time difference between a first arrival time, associated with a first component of a signal, that is transported and/or processed via a first channel within the optical receiver, and a second arrival time, associated with a second component of the signal, that is transported and/or processed via a second channel within the optical receiver. The first channel may correspond to a first optical and/or electrical path within the optical receiver. The second channel may correspond to a second optical and/or electrical path within the optical receiver.

The systems and/or methods may enable a de-skewing device to use the one or more quantities of skew to generate de-skew values that can be used, by the optical receiver, to reduce the skew between the channels of the optical receiver. Reducing the skew, between the channels of the optical receiver, may result in an increase in performance of the optical receiver.

Figure 1:
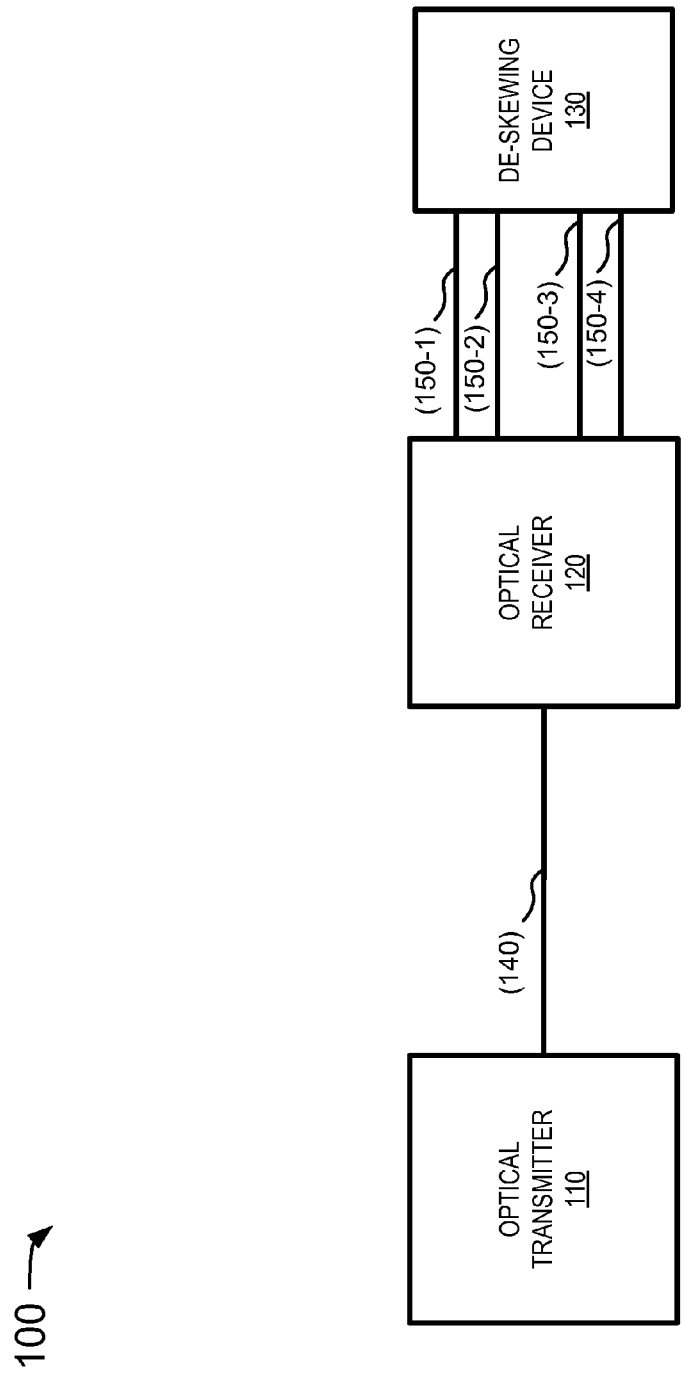
FIG. 1 is a block diagram of an example network in which systems and/or methods described herein may be implemented.

FIG. 1 is a block diagram of an example network 100 in which systems and/or methods described herein may be implemented. Network 100 may include an optical transmitter 110, an optical receiver 120, a de-skewing device 130, an optical network path 140 (hereinafter referred to as "optical path 140"), and a group of electrical network paths 150-1, ..., 150-4 (hereinafter referred to collectively as "electrical paths 150" and individually as "electrical path 150").

The number of devices and/or paths, illustrated in FIG. 1, is provided for explanatory purposes. In practice, there may be additional devices and/or paths, fewer devices and/or paths, different devices and/or paths, or differently arranged devices and/or paths than illustrated in FIG. 1. Also, in some implementations, one or more of the devices of network 100 may perform one or more functions described as being performed by another one or more of the devices of network 100. For example, functions attributable to optical receiver 120 could be performed by de-skewing device 130 and/or by some other device.

Optical transmitter 110 may include one or more devices that generate and/or transmit an optical signal via optical path 140. Optical transmitter 110 may, in an example implementation, include a laser that receives one or more electrical signals and may convert the electrical signals into one or more optical signals. Optical transmitter 110 may multiplex the optical signals (e.g., using wavelength-division multiplexing (WDM)) for transmission to optical receiver 120 via optical path 140. Each of the optical signals may be associated with a different carrier wavelength as a result of the multiplexing.

In another example implementation, optical transmitter 110 may generate a single-polarization optical signal (e.g., that corresponds to a transverse electric (TE) or transverse magnetic (TM) polarization), associated with a scrambled polarization. The scrambled polarization may correspond to polarization, of the optical signal, that changes as a function of time. Optical transmitter 110 may transmit the optical signal to optical receiver 120 via optical path 140.

Optical receiver 120 may include one or more devices that receive, convert, process, amplify, and/or demodulate electrical and/or optical signals in a manner described herein. In an example implementation, optical receiver 120 may be a coherent optical receiver that may receive and/or process optical signals received from optical transmitter 110. Optical receiver 120 may, for example, receive an incoming optical signal that includes a single polarization state, which changes as a function of time. Optical receive 120 may perform a polarization beam splitting operation to break the optical signal into two optical signals, each associated with different polarizations that are orthogonal. For example, the two optical signals may include a first optical signal associated with a first polarization and a second optical signal associated with a second polarization. The second polarization may, in this example, be orthogonal to the first polarization.

Optical receiver 120 may process the first and/or second optical signals to generate real and/or imaginary components (or alternatively, amplitude and phase components) for each of the first optical signal and/or the second optical signal. Optical receiver 120 may demodulate the components, of the first and/or second optical signals, to create electrical signals. Optical receiver 120 may transmit the components, as the electrical signals, to de-skewing device 130 via electrical paths 150.

De-skewing device 130 may include one or more devices that receive, process and/or perform other operations on electrical signals, received from optical receiver 120, in a manner described herein. De-skewing device 130 may receive electrical signals from optical receiver 120 via electrical paths 150. De-skewing device 130 may perform an operation on the electrical signals to measure a quantity of skew associated with the electrical signals and/or to reduce the quantity of skew. De-skewing device 130 may, for example, measure skew between the electrical signals relative to a reference signal or an orthogonal signal (e.g., a signal that is orthogonal to the reference signal) identified from among the electrical signals.

De-skewing device 130 may determine which electrical signals are correlated and may store the skew values associated with the signals that are correlated. De-skewing device 130 may repeatedly perform measurement of the quantity of skew to generate a collection of skew values. De-skewing device 130 may also repeatedly perform the operation to determine which of the signals are correlated. De-skewing device 130 may store a portion of the collection skew values that correspond to the correlated signals.

De-skewing device 130 may use the stored skew values to generate average skew values for the electrical signals. De-skewing device 130 may use the average skew values to identify de-skew values for each signal, which de-skewing device 130 may use to reduce or eliminate skew between the electrical signals.

Optical path 140 may include a network path that is capable of transporting an optical signal. In an example implementation, optical path 140 may be a fiber optic cable via which an optical signal is transported, from optical transmitter 120, to optical receiver 130. Electrical path 150 may include a network path that is capable of transporting an electrical signal. In an example implementation, electrical path 150 may be a wired network path, a wireless network path, and/or a combination of a wired and/or a wireless network path. In another example implementation, electrical path 150 may be a wave guide, a coaxial cable, and/or another network path that is capable of transporting an electrical and/or RF signal. Electrical path 150 may enable an electrical signal to be transported from optical receiver 120 to de-skew device 130. Each electrical path 150 (e.g., electrical paths 150-1, ..., 150-4) may represent a different output channel, associated with optical receiver 120, via which the electrical signals are transmitted to de-skewing device 130.

Figure 2:
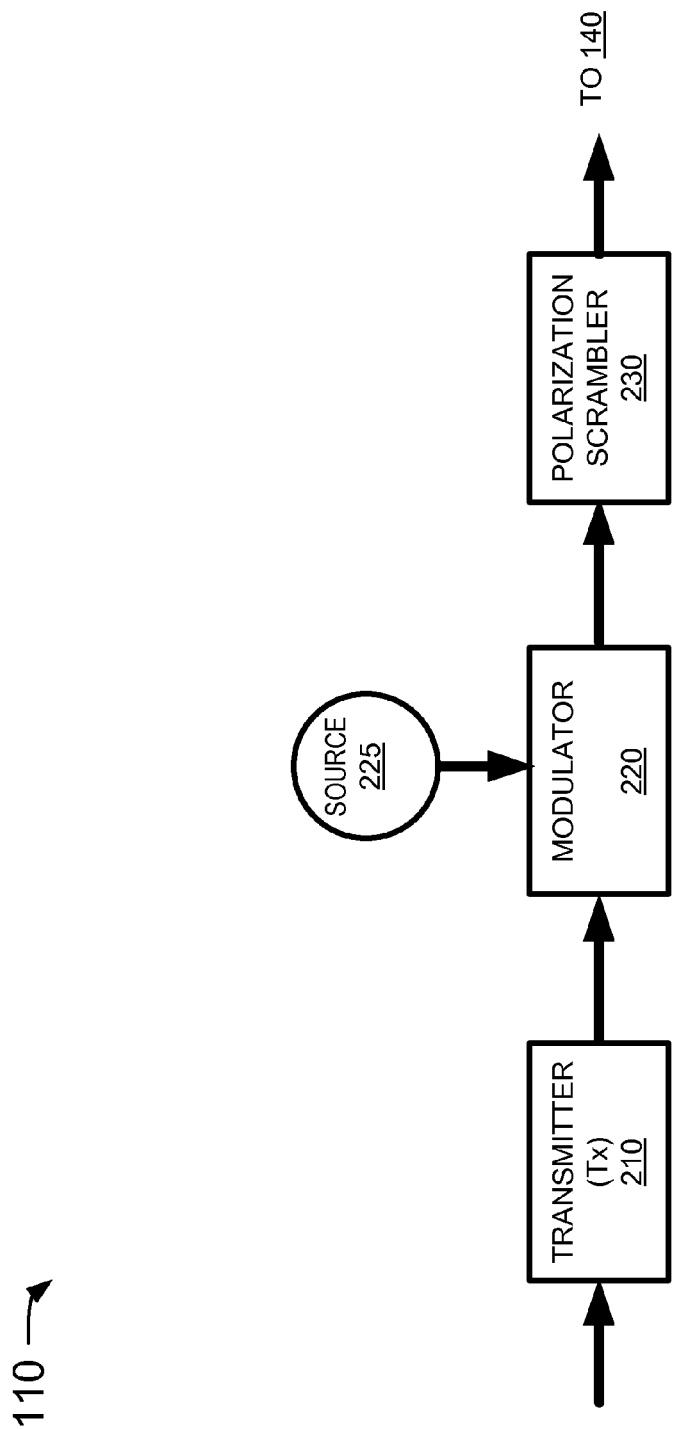
FIG. 2 is a diagram of example components of an optical transmitter device of FIG. 1.

FIG. 2 is a diagram of example components of optical transmitter 110. As illustrated in FIG. 2, optical transmitter 110 may include a collection of components, such as a transmitter (Tx) 210, a modulator 220, a source device 225 (hereinafter referred to as "source 225"), and a polarization scrambler 230. Although FIG. 2 shows example components of optical transmitter 110, in other implementations, optical transmitter 110 may contain fewer components, additional components, different components, or differently arranged components than depicted in FIG. 2. Furthermore, in some implementations, one or more of the components of optical transmitter 110 may perform one or more functions described as being performed by another one or more of the components of optical transmitter 110.

Transmitter 210 may include one or more components that are capable of generating an optical signal that can be outputted to an optical fiber, such as optical path 140. In one implementation, transmitter 210 may include a laser that generates and/or transmits an optical signal at a particular wavelength and/or with a particular bandwidth, which may be tuned and/or calibrated by a user of optical transmitter 110. Transmitter 210 may be tuned to enable the wavelength to be changed in a manner that permits the optical signal to be sent over one or more channels associated with optical path 140. In another example implementation, transmitter 210 may include a laser and/or other device that generates and/or transmits an optical signal associated with a single polarization state. Transmitter 210 may transmit the single-polarization optical signal to modulator 220.

Modulator 220 may include one or more components that are capable of modulating an optical signal received from transmitter 210. In an example implementation, modulator 220 may include a device to modulate a single-polarization optical signal using a random signal received from source 225. For example, modulator 220 may receive a single-polarization optical signal from transmitter 210 and may process the single-polarization optical signal using a random signal received from source 225. In one example, the modulated signal may be a random signal that includes a random set of pulses that are associated with a pseudo-random binary sequence (PRBS) value that is greater than a threshold. Modulator 220 may output, to polarization scrambler 230, a random signal, associated with a single-polarization state (e.g., that includes orthogonal polarization components parallel to the X-axis and/or Y-axis as described above with respect to FIG. 1). In another example implementation, modulator 220 may include a device that converts an optical signal, associated with more than one polarization states, into a single-polarization optical signal that can be modulated using the random signal.

Source 225 may include one or more components that are capable of generating a random signal and/or transmitting the random signal to modulator 220. For example, source 225 may include a device that generates a random signal that may be amplified, processed, and/or outputted to one or more components in optical transmitter 110. Source 225 may, in one example, output a random signal that corresponds to a PRBS signal. Source 225 may, in another example, output a random signal that corresponds to signal that is based on amplified spontaneous emission noise Polarization scrambler 230 may include a component or set of components that are capable of scrambling a polarization state associated with a modulated signal received from modulator 220. For example, polarization scrambler 230 may receive, from modulator 220, the random signal associated with a single-polarization state and may cause the polarization state, associated with the signal, to continuously change as a function of time. The continuous change in the polarization state (e.g., associated with a polarization vector and/or principle state of polarization (PSP)) may be associated with a periodic, a random, and/or some other change in polarization state. Polarization scrambler 230 may output the signal with the scrambled polarization state, as an optical signal, to optical receiver 120 via optical path 140.

Figure 3A:
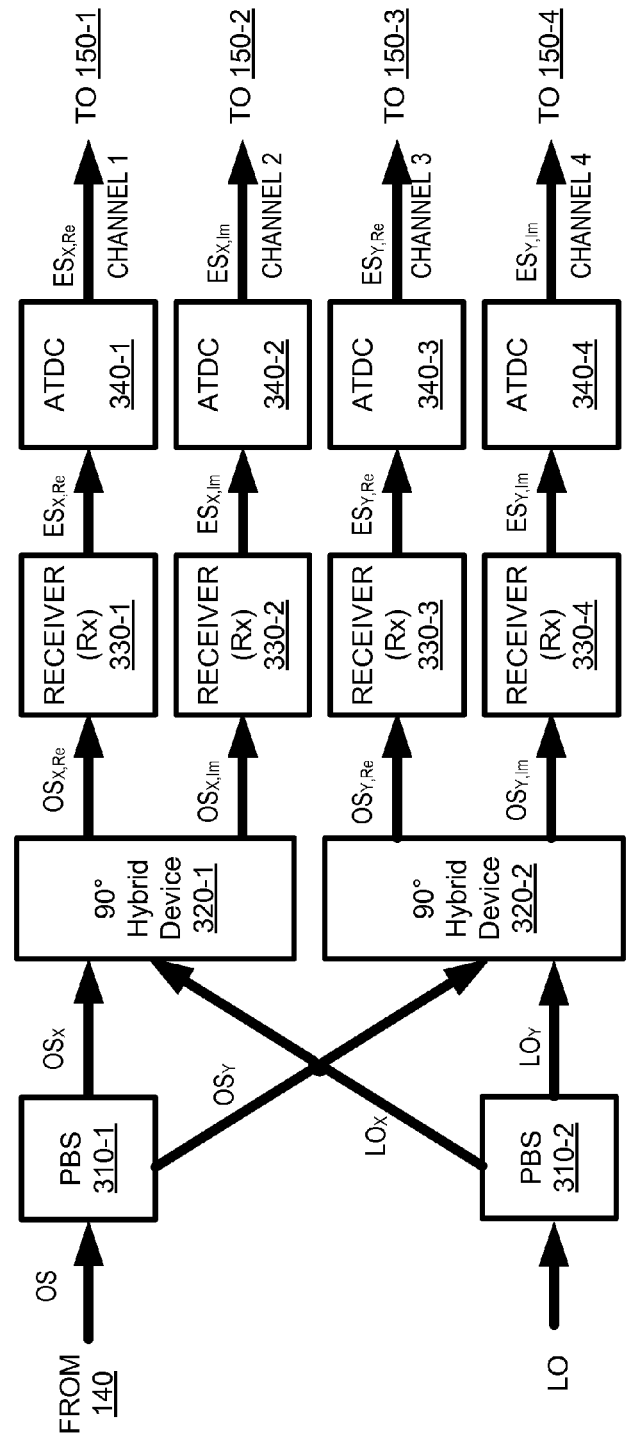
FIG. 3A is a diagram of example components of an optical receiver device of FIG. 1.

FIG. 3A is a diagram of example components of optical receiver 120. As illustrated in FIG. 3A, optical receiver 120 may include a collection of components, such as a pair of polarization beam splitters (PBS) 310-1 and 310-2 (hereinafter referred to collectively as "PBSs 310" and individually as "PBS 310"), a pair of 90 degree hybrid devices 320-1 and 320-2 (hereinafter referred to collectively as "hybrid devices 320" and individually as "hybrid device 320"), a group of receivers (Rx) 330-1, . . . , 330-4 (hereinafter referred to collectively as "receivers 330" and individually as "receiver 330"), and a group of analog-to-digital converters (ADC) 340-1, . . . , 340-4 (hereinafter collectively referred to as "ADCs 340" and individually as an "ADC 340").

Although FIG. 3A shows example components of optical receiver 120, in other implementations, optical receiver 120 may contain fewer components, additional components, different components, or differently arranged components than depicted in FIG. 3A. Furthermore, in some implementations, one or more of the components of optical receiver 120 may perform one or more functions described as being performed by another one or more of the components of optical receiver 120.

PBS 310 may include one or more devices that receive an optical signal and/or convert the optical signal into different component signals each associated with a different polarization. For example, PBS 310-1 may receive a random single-polarization optical signal (e.g., shown as OS in FIG. 3A) from optical transmitter 110 via optical path 140. PBS 310-1 may split and/or divide the random single polarization optical signal into two signals each associated with a different orthogonal polarization. For example, PBS 310-1 may generate (e.g., by splitting and/or dividing the random single polarization optical signal) a first optical signal (e.g., shown as $OS_X$) associated with a first polarization that is parallel to one of a pair of orthogonal axes (e.g., the X-axis). PBS 310-1 may also use the optical signal to generate a second optical signal (e.g., shown as $OS_Y$ in FIG. 3A) associated with a second polarization that is parallel to another one of the pair of orthogonal axes (e.g., the Y-axis). PBS 310-1 may output, to hybrid device 320, the first optical signal and/or the second optical signal.

Occasionally, the optical signal may be received with an instantaneous polarization that includes a single constituent polarization component (e.g., parallel to the Y-axis or to the X-axis). In this specialized example, PBS 310-1 may not generate the first optical signal or the second optical signal; rather, PBS 310-1 may output, to hybrid device 320, the optical signal with the constituent polarization component.

In another example, PBS 310-2 may receive a reference optical signal (e.g., shown as LO in FIG. 3A) from a local oscillator (LO). The local oscillator may, for example, be a laser that generates the reference optical signal that is associated with a first frequency and/or phase that is approximately equal to a second frequency (sometimes referred to herein as a "carrier frequency") and/or phase, associated with the optical signal (e.g., OS), respectively.

PBS 310-2 may use the reference optical signal to generate a first reference signal (e.g., shown as $LO_X$) associated with the first polarization (e.g., a polarization state parallel to an X-axis, which may correspond to a TM or TE polarization). PBS 310-2 may also use the reference optical signal to generate a second reference signal (e.g., shown as $LO_Y$ in FIG. 3A) associated with the second polarization (e.g., a polarization state parallel to a Y-axis, which is orthogonal to the X-axis). PBS 310-2 may output, to hybrid device 320-2, the first and/or the second reference signal.

Hybrid device 320 may include one or more devices that receive an optical signal associated with a single polarization component and can process the optical signal to generate real and/or imaginary components associated with the optical signal. In an example implementation, hybrid device 320 may include an optical 90 degree hybrid device that combines the reference signal with a received optical signal to generate real and/or imaginary components of the received optical signal.

Hybrid device 320-1 may, for example, receive the first optical signal (e.g., $OS_X$) from PBS 310-1 and/or the first reference signal (e.g., $LO_X$) from PBS 310-2. Hybrid device 320-1 may mix the first reference signal with the first optical signal. Hybrid device 320-1 may generate a real component (e.g., shown as $OS_{X,Re}$ in FIG. 3A, where Re represents the real component) and/or an imaginary component (e.g., shown as $OS_{X,Im}$ in FIG. 3A, where Im represents the imaginary component) of the first optical signal combined with the first reference signal.

Hybrid device 320-2 may, in another example, receive the second optical signal (e.g., $OS_Y$) from PBS 310-1 and the second reference signal (e.g., $LO_Y$) from PBS 310-2. Hybrid device 320-2 may mix the second reference signal (e.g., $LO_Y$), with the second optical signal. Hybrid device 320-2 may generate a real component (e.g., shown as $OS_{Y,Re}$ in FIG. 3A) and/or an imaginary component (e.g., shown as $OS_{Y,Im}$ in FIG. 3A) of the second optical signal combined with the second reference signal.

Hybrid devices 320 may output the real and/or imaginary components of the first and/or second optical signals, combined with the first and/or second reference signals, to receivers 330. The real and/or imaginary components of the first and/or second optical signals, combined with the first and/or second reference signals, may be transmitted to receivers 330 via one or more channels (e.g., channel 1, . . . , channel 4) associated with optical receiver 120.

Receiver 330 may include one or more devices that receive an optical signal and convert the optical signal into an electrical signal. Receiver 330 may, in an example implementation, be a photo diode that receives, as input, the optical signal and generates, as output, an electrical signal based on the received optical signal.

Receiver 330-1 may, for example, receive a real component of the first optical signal (e.g., $OS_{X,Re}$) and may convert the real component, of the first optical signal, to a first electrical signal (e.g., shown as $ES_{X,Re}$ in FIG. 3A). Receiver 330-1 may transmit the first electrical signal to ADC 340-1 via a first channel (e.g., channel 1). Receiver 330-2 may, in another example, receive an imaginary component of the first optical signal (e.g., $OS_{X,Im}$) and may convert the imaginary component, of the first optical signal, to a second electrical signal (e.g., shown as $ES_{X,Im}$ in FIG. 3A). Receiver 330-2 may transmit the second electrical signal to ADC 340-2 via a second channel (e.g., channel 2).

Receiver 330-3 may, for example, receive a real component of the second optical signal (e.g., $OS_{Y,Re}$) and may convert the real component, of the second optical signal, to a third electrical signal (e.g., shown as $ES_{Y,Re}$ in FIG. 3A). Receiver 330-3 may transmit the third electrical signal to ADC 340-3 via a third channel (e.g., channel 3). Receiver 330-4 may, in another example, receive an imaginary component of the second optical signal (e.g., $OS_{Y,Im}$) and may convert the imaginary component, of the second optical signal, to a fourth electrical signal (e.g., shown as $ES_{Y,Im}$ in FIG. 3A). Receiver 330-4 may transmit the fourth electrical signal to ADC 340-4 via a fourth channel (e.g., channel 4).

ADC 340 may include one or more devices that receive and/or process an electrical signal to convert the electrical signal into a digital electrical signal. ADC 340 may, in an example implementation, convert electrical signals, received from receivers 330, to digital electrical signals for transmission to de-skew device 130 via electrical paths 150. ADC 340 may, for example, sample an incoming electrical signal at a sampling rate that is greater than a threshold. The threshold may correspond to a Nyquist sampling rate that is greater than two times a bandwidth associated with the incoming electrical signal. ADC 340 may use the sampled signal to generate the digital electrical signal.

Figure 3B:
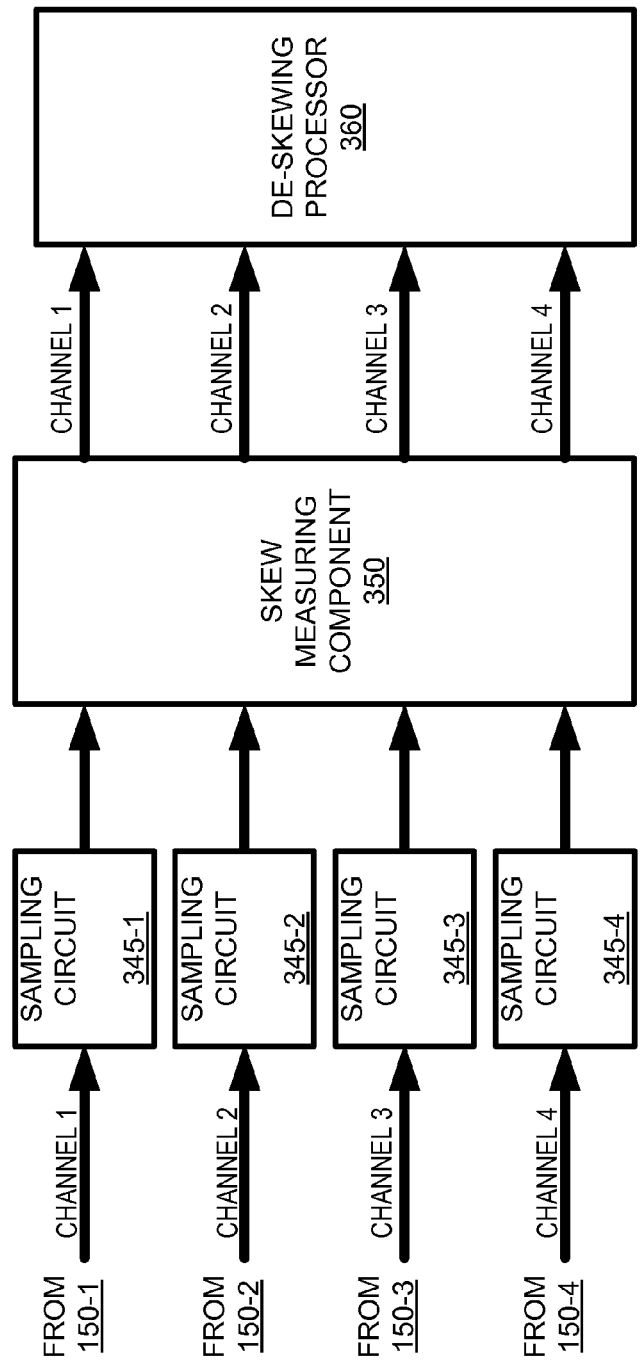
FIG. 3B is a diagram of example components of a de-skewing device of FIG. 1.

FIG. 3B is a diagram of example components of a de-skewing device 130. As illustrated in FIG. 3B, de-skewing device 130 may include a collection of components, such as a group of sampling circuits 345-1, . . . , 345-4 (hereinafter collectively referred to as "sampling circuits 345" and individually as a "sampling circuit 345"), a skew measuring component (SMC) 350, and a de-skewing processor 360. Although FIG. 3B shows example components of de-skewing device 130, in other implementations, de-skewing device 130 may contain fewer components, additional components, different components, or differently arranged components than depicted in FIG. 3B. Furthermore, in some implementations, one or more of the components of de-skewing device 130 may perform one or more functions described as being performed by another one or more of the components of de-skewing device 130.

Figure 4:
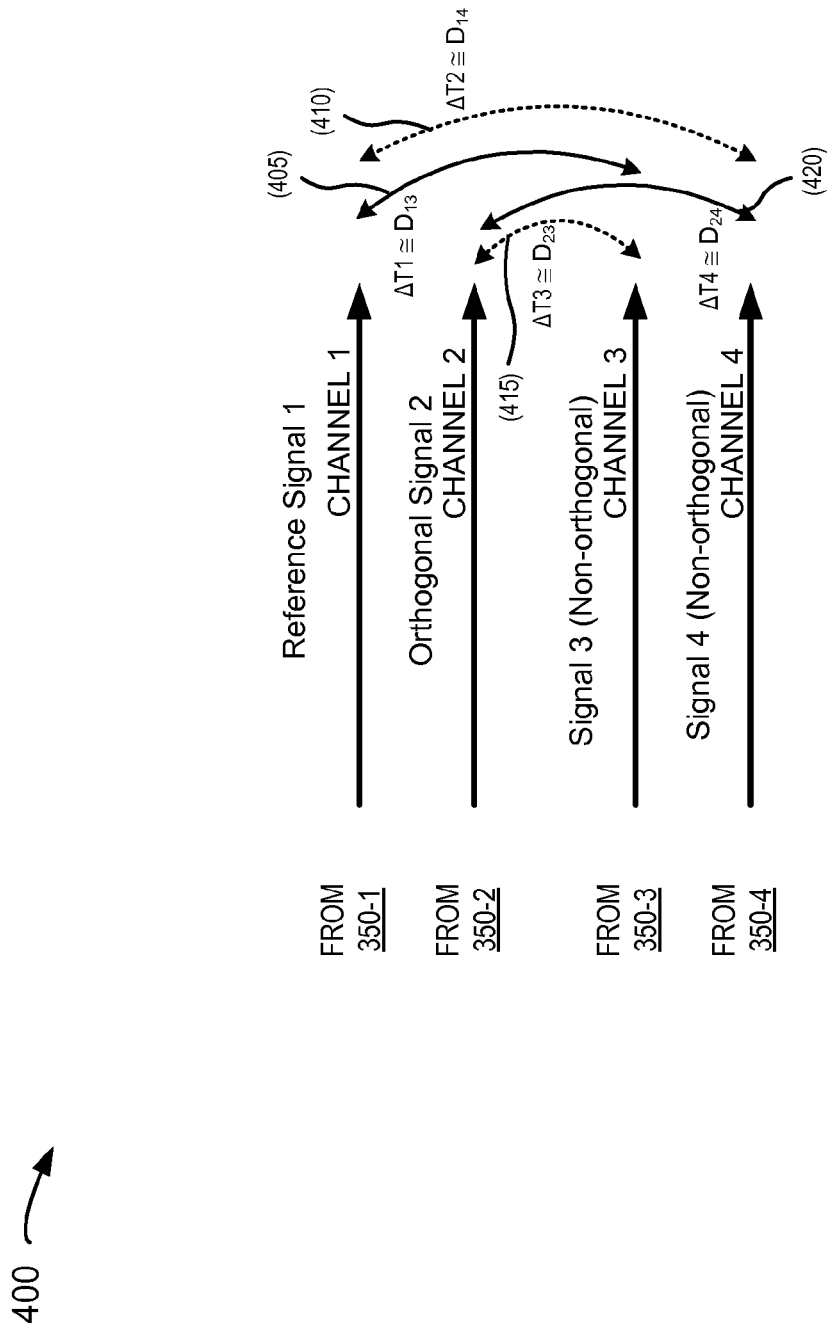
FIG. 4 is a diagram that illustrates a manner in which example quantities of skew between one or more channels, of an optical receiver, are measured according to an implementation described herein.

FIG. 4 is a diagram that illustrates a manner in which example quantities of skew between one or more channels, of optical receiver 120, are measured according to an implementation described herein. One or more components, of de-skewing device 130, will be discussed below with corresponding references to FIG. 4.

Sampling circuit 345 may include one or more devices that receive, process, and/or sample electrical signals received via one or more channels (e.g., via electrical paths 150) associated with optical receiver 120. Sampling circuit 345 may, in an example implementation, sample and/or record a portion of an electrical signal, received from optical receiver 120, for a period of time that corresponds to an up-sampling interval. Sampling the portion of the electrical signal may permit de-skewing processor 360 to control a level of accuracy associated with determining a quantity of skew associated the electrical signal.

Sampling circuit 345 may sample an electrical signal (e.g., electrical signals 1, 2, 3, or 4), received from optical receiver 130, based on an instruction received from de-skewing processor 360. For example, sampling circuit 345 may receive an instruction to up-sample an electrical signal that specifies a resolution (e.g., 4 pico seconds (ps)) at which the skew could be measured. In another example, the instruction may include a factor by which the electrical signal is to be up-sampled relative to a sampling rate associated with ADC 340 (e.g., a factor of 2, 3, 4, etc.).

In one example, the electrical signal may be up-sampled at a rate that is greater than a sampling rate at which ADC 340 sampled the electrical signal. Assume, for example, that ADC 340 sampled the electrical signal at an interval of 20 pico seconds (ps). The sampling interval may represent a minimum quantity of skew that could be detected by de-skewing device 130. In other words, an electrical signal, with a quantity of skew that is less 20 ps, could not be detected by de-skewing device 130 unless an up-sample operation is performed on the electrical signal.

By up-sampling the electrical signal, sampling circuit 345 may enable a resolution level, associated with measuring a quantity of skew, to be improved. Assume, for example, that the up-sampling instruction indicates that an electrical signal is to be up-sampled by a factor of 5. Sampling circuit 345, may up-sample the electrical signal at an interval of 4 ps (e.g., an up-sampled rate=20 ps/5). The up-sampled rate may enable de-skewing device 130 to detect a quantity of skew that is less than that which would have been detected without up-sampling the electrical signal (e.g., as low as 4 ps in this example). Sampling circuit 345 may transmit the up-sampled electrical signal to SMC 350.

SMC 350 may include one or more devices that receive, process, and/or determine a quantity of skew associated with electrical signals received from sampling circuit 345. SMC 350 may, for example, receive an instruction, from de-skewing processor 360, to measure a quantity of skew associated with the electrical signals (e.g., the first, second, third, and/or fourth electrical signals) received from sampling circuits 345 via one or more channels (e.g., via channels 1, 2, 3, and/or 4, respectively). The instruction may designate which of the signals is a reference signal (e.g., the first electrical signal, as reference signal 1). SMC 350 may use the reference signal to determine a quantity of skew for one or more of the other signals. In another example implementation, SMC 350 may designate a signal, that is different than the first electrical signal, as the reference signal.

SMC 350 may identify another electrical signal that is orthogonal to, and/or independent of, the reference signal. The orthogonality of the orthogonal signal may be based on hardware (e.g., hybrid device 320) that renders the orthogonal signal independent of the reference signal. SMC 350 may, for example, identify an orthogonal signal (e.g., the second electrical signal, received via channel two) that is orthogonal to reference signal 1 (e.g., received via channel one). SMC 350 may use the orthogonal signal to determine skew for one or more of the other, non-orthogonal signals (e.g., the third and/or fourth electrical signals received via channel three and/or channel four, respectively). In another example implementation, SMC 350 may designate a signal, that is different than the second electrical signal, as the orthogonal signal.

As shown in FIG. 4, for example, SMC 350 may measure a first quantity of skew (e.g., $D_{13}$) between the reference signal (e.g., shown, in FIG. 4, as reference signal 1, received via channel 1) and electrical signal 3 (e.g., shown, in FIG. 4, as signal 3 (non-orthogonal), received via channel 3). SMC 350 may measure the first quantity of skew between channel 1 and channel 3 (e.g., as shown by solid arrow 405 of FIG. 4). The first quantity of skew may be based on a difference in arrival time between reference signal 1 and signal 3 (e.g., shown in FIG. 4 as $\Delta T1 \cong D_{13}$, where $\Delta T1$ represents the difference in arrival time between the reference signal 1 and electrical signal 3). In another example, arrival time may correspond to a time difference between detecting a predetermined sequence of bits and/or symbols associated with one signal and detecting the predetermined sequence of bits or symbols associated with another signal.

SMC 350 may also measure a second quantity of skew (e.g., $D_{14}$) between reference signal 1 and electrical signal 4 (e.g., shown, in FIG. 4, as signal 4 (non-orthogonal) received via channel 4). SMC 350 may measure the second quantity of skew between channel 1 and channel 4 (e.g., as shown by dotted arrow 410 of FIG. 4). The second quantity of skew may be based on a difference in arrival time between reference signal 1 and electrical signal 4 (e.g., shown in FIG. 4 as $\Delta T2 \cong D_{14}$, where $\Delta T2$ represents the difference in arrival time between the reference signal 1 and electrical signal 4).

SMC 350 may measure a third quantity of skew (e.g., $D_{23}$) between orthogonal signal 2 (e.g., shown, in FIG. 4, as orthogonal signal 2, received via channel 2) and electrical signal 3 (e.g., shown, in FIG. 4, as signal 3 (non-orthogonal) received via channel 3). SMC 350 may measure the third quantity of skew between channel 2 and channel 3 (e.g., as shown by dotted arrow 415 of FIG. 4). The third quantity of skew may be based on a difference in arrival time between orthogonal signal 2 and electrical signal 3 (e.g., shown in FIG. 4 as $\Delta T3 \cong D_{23}$, where $\Delta T3$ represents the difference in arrival time between the orthogonal signal 2 and electrical signal 3).

SMC 350 may also measure a fourth quantity of skew (e.g., $D_{24}$) between orthogonal signal 2 and electrical signal 4 (e.g., shown, in FIG. 4, as signal 4 (non-orthogonal), received via channel 4). SMC 350 may measure the fourth quantity of skew between channel 2 and channel 4 (e.g., as shown by solid arrow 420 of FIG. 4). The fourth quantity of skew may be based on a difference in arrival time between orthogonal signal 2 and electrical signal 4 (e.g., shown, in FIG. 4, as $\Delta T4 \cong D_{24}$, where $\Delta T4$ represents the difference in arrival time between orthogonal signal 2 and electrical signal 4). SMC 350 may transmit the measured quantities of skew (e.g., the first, second, third, and/or fourth quantities of skew) to de-skewing processor 360. SMC 350 may, in a manner similar to that described above, repeatedly perform the skew measurements to generate a number quantities of skew that correspond to the first, second, third, and/or fourth quantities of skew. The number of quantities of skew may be transmitted, by SMC 350, to de-skewing processor 360.

De-skewing processor 360 may include one or more processors that determine a manner in which to de-skew signals received via one or more channels of optical receiver 120. For example, de-skewing processor 360 may receive measured quantities of skew from SMC 350 and may perform a de-skewing operation based on the measured quantities of skew. De-skewing processor 360 may, for example, determine which pairs of signals are correlated based on the measured quantities of skew. Correlation between signals may occur in pairs, such as, for example, when reference signal 1 and electrical signal 3 are correlated, de-skewing processor 360 may determine that orthogonal signal 2 and the electrical signal 4 are correlated. In another example, when reference signal 1 and electrical signal 4 are correlated, de-skewing processor 360 may determine that orthogonal signal 2 and electrical signal 3 are correlated.

When determining which pairs of signals are correlated, de-skewing processor 360 may perform a correlation operation on a first pair of signals (e.g., reference signal 1 and electrical signal 3) and a second pair of signals (e.g., reference signal 1 and electrical signal 4) to determine a maximum correlation value for each pair of signals.

De-skewing processor 360 may, for example, perform a correlation operation by multiplying each sample, within a portion of samples associated with reference signal 1, by a respective different sample within a portion of samples associated with a delayed version of electrical signal 3. The delayed version of electrical signal 3 may be delayed, by de-skewing processor 360, by a predetermined delay period (e.g., by a first delay period $T_{D1}$). The product of the multiplied reference signal 1 and the electrical signal 3 (delayed by the first delay period $T_{D1}$) may result in a series of values. De-skewing processor 360 may determine a first correlation value, for the first pair of signals, based on a sum of the series obtained as a result of multiplying the first signal and the delayed version of electrical signal 3. De-skewing processor 360 may determine a second correlation value for the first pair of signals by repeating the correlation operation using a second delay period (e.g., $T_{D2}=T_{D1}+A$, where A is determined by de-skewing processor 360). De-skewing processor 360 may generate a first set of correlation values, based on different delay periods for the first pair of signals. De-skewing processor 360 may identify a first maximum correlation value that is greater than the other correlation values within the first set of correlation values associated with the first pair of signals.

De-skewing processor 360 may, in a manner similar to that described above, repeat the correlation operation on the second pair of signals. For example, de-skewing processor 360 may generate a second set of correlation values between reference signal 1 and a delayed version of electrical signal 4. The delayed version of electrical signal 4 may be based on different delay periods in a manner similar to that described above. De-skewing processor 360 may identify a second maximum correlation value that is greater than the other correlation values within the second set of correlation values associated with the second pair of signals.

De-skewing processor 360 may determine which pair of signals is correlated by comparing the first maximum correlation value (e.g., that corresponds to the first pair of signals) to the second maximum correlation value (e.g., that corresponds to the second pair of signals). Based on a determination that the first maximum correlation value is greater than the second maximum correlation value, de-skewing processor 360 may determine that reference signal 1 and the electrical signal 3 are correlated. Based on the determination that reference signal 1 and electrical signal 3 are correlated, de-skewing processor 360 may determine that orthogonal signal 2 and electrical signal 4 are correlated. Based on the determination that reference signal 1 and electrical signal 3 and/or that orthogonal signal 2 and electrical signal 4 are correlated, de-skewing processor 360 may store a value associated with the first quantity of skew (e.g., $D_{13}$) and another value associated with the fourth quantity of skew (e.g., $D_{24}$) in a first logical bin, within a memory, associated with de-skewing processor 360.

In another example, de-skewing processor 360 may determine that the first maximum correlation value is not greater than the second maximum correlation value. Based on the determination that the first maximum correlation value is not greater than the second maximum correlation value, de-skewing processor 360 may determine that reference signal 1 and the electrical signal 4 are correlated. Based on the determination that reference signal 1 and electrical signal 4 are correlated, de-skewing processor 360 may determine that orthogonal signal 2 and electrical signal 3 are correlated. Based on the determination that reference signal 1 and electrical signal 4 and/or that orthogonal signal 2 and electrical signal 3 are correlated, de-skewing processor 360 may store a value associated with the second quantity of skew (e.g., $D_{14}$) and another value associated with the third quantity of skew (e.g., $D_{23}$) in a second logical bin, within a memory, associated with de-skewing processor 360.

De-skewing processor 360 may repeatedly perform the operation to identify which pairs of signals are correlated for each set of skew values (e.g., the first, second, third, and/or fourth skew values) that are received from SMC 350. De-skewing processor 360 may, for example, repeatedly store values associated with first and/or fourth quantities of skew in the first logical bin when the reference signal and electrical signal 3 are determined to be correlated. De-skewing processor 360 may, in another example, repeatedly store values associated with second and/or third quantities of skew in the second logical bin when the reference signal and electrical signal 4 are determined to be correlated. The operation to identify which pairs of signals are correlated may continue until a quantity of skew values, stored in the first and/or second logical bins is greater than a threshold. The threshold may, for example, correspond to a statistically relevant quantity of values (e.g., nine pairs of values, stored in the first logical bin, compared with eleven pairs of skew values, stored in the second logical bin, out of 20 sets of skew values received from SMC 350).

De-skewing processor 360 may, for example, send instructions to SMC 350 to generate additional sets of skew values until the quantity of skew values stored in the first and/or second logical bins is greater than the threshold. Additionally, or alternatively, de-skewing processor 360 may instruct SMC 350 to continue generate the additional sets of skew values if the first bin or the second bin does not store a quantity of values, associated with quantities of skew, that is greater than another threshold.

De-skewing processor 360 may use the skew values stored in the first and/or second logical bins to generate an average skew values. For example, de-skewing processor 360 may generate a first skew value (e.g., $D'_{13}$) based on an average of the values associated with the first quantities of skews (e.g., $D_{13}$) that are stored in the first bin. De-skewing processor 360 may generate a fourth skew value (e.g., $D'_{24}$) based on an average of the values associated with the fourth quantities of skew (e.g., $D_{24}$) that are stored in the first bin. De-skewing processor 360 may generate a third skew value (e.g., $D'_{23}$) based on an average of the values associated with the third quantities of skew (e.g., $D_{23}$) that are stored in the second bin. De-skewing processor 360 may generate a second skew value (e.g., $D'_{14}$) based on an average of the values associated with the fourth quantities of skew (e.g., $D_{14}$) that are stored in the second bin. The term average, as used herein, may include a numerical average, mean, median, mid-point, and/or a weighted average, weighted mean, etc.

De-skew processor 360 may use the average skew values to generate de-skew values that de-skew processor 360 may use to process the traffic to reduce and/or eliminate the skew associated with the channels. For example, de-skew processor 360 may set a first de-skew value (e.g., $D_1$), that corresponds to reference channel one, to a predetermined value (e.g., $D_1=0$ or some other predetermined value). De-skew processor 360 may generate a third de-skew value (e.g., $D_3$), that corresponds to the third channel, that is approximately equal to the third skew value (e.g., $D'_{13}$). De-skew processor 360 may generate a fourth de-skew value (e.g., $D_4$), that corresponds to the fourth channel, that is approximately equal to the fourth skew value (e.g., $D'_{14}$).

De-skew processor 360 may generate a second de-skew value (e.g., $D_2$), that corresponds to orthogonal channel two, based on each of the skew values, such as the first skew value (e.g., $D'_{13}$), the second skew value (e.g., $D'_{14}$), the third skew value (e.g., $D'_{23}$), and/or the fourth skew value (e.g., $D'_{24}$). In one example, the second de-skew value may be generated based on one-half of a quantity defined by a sum of the first and second skew values minus another sum of the third and fourth skew values (e.g., $D_2=\frac{1}{2}\times(D_{13}+D_{14}-(D_{23}+D_{24}))$). De-skew processor 360 may transmit the de-skew values to optical receiver 120, which may allow optical receiver 120 to reduce or eliminate skew associated with each channel based on the de-skew values.

Figure 5A:
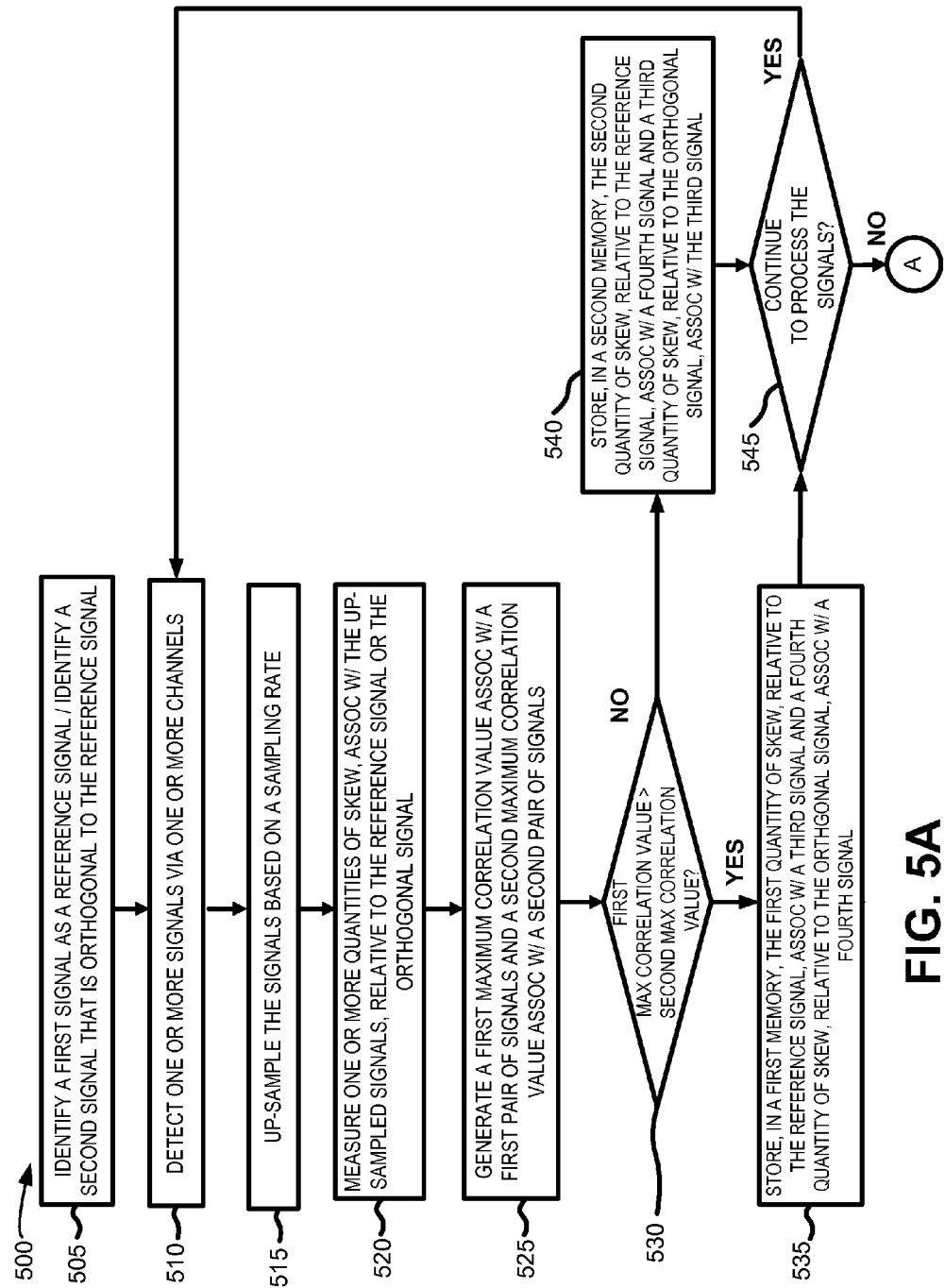

FIGS. 5A and 5B are flowcharts of an example process 500 for performing a de-skewing operation according to an implementation described herein. In one example implementation, process 500 may be performed by de-skewing device 130. In another example implementation, some or all of process 500 may be performed by a device or collection of devices separate from, or in combination with de-skewing device 130.

As shown in FIG. 5A, process 500 may include identifying a first signal as a reference signal and a second signal that is orthogonal to the reference signal (block 505) and detecting one or more signals via one or more channels (block 510). For example, de-skewing device 130 may designate a first signal, received from optical receiver 120, as reference signal 1. The designation of the first signal as reference signal 1 may be predetermined by de-skewing device 130 and/or specified by an operator of de-skewing device 130. Additionally, de-skewing device 130 may designate a second signal, received from optical receiver 120, as orthogonal signal 2. Third and/or fourth signals, received from optical receiver 120, may be identified as non-orthogonal signals.

In another example implementation, de-skewing device 130 may designate another signal as the reference signal and/or a further signal as the orthogonal signal. For example, de-skewing device 130 may designate the electrical signal 3 as the reference signal and/or electrical signal 4 as the orthogonal signal. In another example, de-skewing device 130 may designate signal 2 as the reference signal and/or electrical signal 1 as the orthogonal signal, etc.

De-skewing device 130 may detect one or more of the electrical signals, received from optical receiver 120, via one or more channels corresponding to electrical paths 150. Each of the one or more signals may, in a manner similar to that described above with respect to FIG. 3A, correspond to a different polarization state (e.g., a polarization that is parallel to an X-axis and/or a Y-axis, where the X and Y-axes are orthogonal to each other) and/or a real component and/or an imaginary component (e.g., that corresponds to an amplitude and/or a phase, respectively). Additionally, the one or more electrical signals may have been generated, by optical receiver 120, as a result processing a single-polarization optical signal, received from optical transmitter 110. The single-polarization optical signal may be associated with a scrambled polarization state in a manner similar to that described above with respect to FIG. 3A.

For example, a first signal, received via a first channel (e.g., corresponding to electrical path 150-1), may be a real component associated with a first polarization (e.g., a polarization parallel to the X-axis). A second signal, received via a second channel (e.g., corresponding to electrical path 150-2), may be an imaginary component associated with the first polarization. A third signal, received via a third channel (e.g., corresponding to electrical path 150-3), may be a real component associated with a second polarization (e.g., a polarization parallel to the Y-axis). A fourth signal may, received via a fourth channel (e.g., corresponding to electrical path 150-1), be an imaginary component associated with the second polarization. In other example implementations, the first, second, third, and/or fourth signals may be associated with different polarizations and/or components (e.g., real or imaginary) than described above.

As also shown in FIG. 5A, process 500 may include up-sampling the signals based on a sampling rate (block 515). For example, de-skewing device 130 may, in a manner similar to that described above with respect to FIG. 3B, up-sample each of the one or more signals based on a sampling rate that is predetermined by de-skewing device 130 and/or specified by an operator of de-skewing device 130. The sampling rate may be greater than another sampling rate used by optical receiver 120 to convert one or more optical signals into the one or more electrical signals. For example, the sampling rate may be associated with a time interval (e.g., an up-sampling interval, such as every 5 ps, 6 ps, etc.) at which the one or more electrical signals are to be up-sampled. In another example, the sampling rate may specify an up-sampling factor that the electrical signal is to be up-sampled relative to the other sampling rate (e.g., a factor of 2, 3, 4, 5, etc.).

The up-sampling rate may be used to improve a level of resolution and/or accuracy, with which to measure skew associated with the one or more signals, relative to another level of accuracy that could be measured without up-sampling the electrical signals.

As further shown in FIG. 5A, process 500 may include measuring one or more quantities of skew associated with the up-sampled signals (block 520). For example, de-skewing device 130 may measure a quantity of skew, associated with the up-sampled signals, in a manner similar to that described above with respect to FIGS. 3A and 4. For example, de-skewing device 130 may measure a first quantity of skew (e.g., $D_{13}$) between reference signal 1 and electrical signal 3. The first quantity of skew may be based on a difference in arrival time between the reference signal 1 and electrical signal 3.

De-skewing device 130 may also measure a second quantity of skew (e.g., $D_{14}$) between the reference signal 1 and electrical signal 4. The second quantity of skew may be based on a difference in arrival time between reference signal 1 and electrical signal 4.

De-skewing device 130 may measure a third quantity of skew (e.g., $D_{23}$) between the orthogonal signal 2 and electrical signal 3. The third quantity of skew may be based on a difference in arrival time between the orthogonal signal 2 and electrical signal 3.

De-skewing device 130 may also measure a fourth quantity of skew (e.g., $D_{24}$) between the orthogonal signal 2 and electrical signal 4. The fourth quantity of skew may be based on a difference in arrival time between the orthogonal signal 2 and electrical signal 4.

As also shown in FIG. 5A, process 500 may include generating a first maximum correlation value associated a first pair of signals and a second maximum correlation value associated with a second pair of signals (block 525). For example, de-skewing device 130 may, in a manner similar to that described above with respect to FIG. 4, generate a first correlation value associated with a first pair of signals, such as reference signal 1 and a delayed version (e.g., delayed by time, $T_{D1}$) of electrical signal 3. De-skewing device 130 may, for example, determine the first correlation value, for the first pair of signals, based on a sum of a series of samples obtained from the product of reference signal 1 multiplied by the delayed version of electrical signal 3. De-skewing device 130 may determine a second correlation value for the first pair of signals by repeating the correlation operation using a second delay period (e.g., $T_{D2}=T_{D1}+A$, where A is a determined value). De-skewing device 130 may generate a first set of correlation values, based on different delay periods (e.g., $T_{D1}$, $T_{D2}$, $T_{D3}$, etc.) for the first pair of signals. De-skewing processor 360 may identify a first maximum correlation value that is greater than the other correlation values within the first set of correlation values associated with the first pair of signals.

De-skewing device 130 may, in a manner similar to that described above, repeat the correlation operation on the second pair of signals, such as reference signal 1 and a delayed version of electrical signal 4. For example, de-skewing device 130 may generate a second set of correlation values between reference signal 1 and a delayed version of electrical signal 4. The delayed version of electrical signal 4 may be based on different delay periods in a manner similar to that described above. De-skewing device 130 may identify a second maximum correlation value that is greater than the other correlation values within the second set of correlation values associated with the second pair of signals.

As further shown in FIG. 5A, if a first maximum correlation value is greater than a second maximum correlation value (block 530—YES), then process 500 may include storing, in a first memory, the first quantity of skew, relative to the reference signal, associated with a third signal and a fourth quantity of skew, relative to the orthogonal signal, associated with a fourth signal (block 535). For example, de-skewing device 130 may determine which pair of signals is correlated by comparing the first maximum correlation value (e.g., that corresponds to the first pair of signals) to the second maximum correlation value (e.g., that corresponds to the second pair of signals). De-skewing device 130 may, based on a determination that the first maximum correlation value is greater than the second maximum correlation value, determine that reference signal 1 and the electrical signal 3 are correlated. Based on the determination that reference signal 1 and electrical signal 3 are correlated, de-skewing device 130 may determine that orthogonal signal 2 and electrical signal 4 are correlated. Based on the determination that reference signal 1 and electrical signal 3 and/or that orthogonal signal 2 and electrical signal 4 are correlated, de-skewing device 130 may store a value associated with the first quantity of skew (e.g., $D_{13}$) and another value associated with the fourth quantity of skew (e.g., $D_{24}$) in a first memory associated with de-skewing device 130.

As still further shown in FIG. 5A, if the first maximum correlation value is not greater than the second maximum correlation value (block 530—NO), then process 500 may include storing, in a second memory, the second quantity of skew, relative to the reference signal, that is associated with the fourth signal, and a third quantity of skew, relative to the orthogonal signal, that is associated with the third signal (block 540). For example, de-skewing device 130 may determine that the first maximum correlation value is not greater than the second maximum correlation value. Based on the determination that the first maximum correlation value is not greater than the second maximum correlation value, de-skewing device 130 may determine that reference signal 1 and the electrical signal 4 are correlated. Based on the determination that reference signal 1 and electrical signal 4 are correlated, de-skewing device 130 may determine that orthogonal signal 2 and electrical signal 3 are correlated. Based on the determination that reference signal 1 and electrical signal 4 and/or that orthogonal signal 2 and electrical signal 3 are correlated, de-skewing device 130 may store a value associated with the second quantity of skew (e.g., $D_{14}$) and another value associated with the third quantity of skew (e.g., $D_{23}$) in a second logical bin, within a second memory, associated with de-skewing device 130.

As shown in FIG. 5A, if the signals are to continue to be processed (block 545—YES), then process 500 may include detecting the one or more signals via the one or more channels (block 510). For example, de-skewing device 130 may continue to process the signals based on a determination that a quantity of values associated with a quantity of skew, which are stored in the first memory, is less than a threshold. The quantity of values, as described above, may correspond to the first pair of signals, such as reference signal 1 and electrical signal 3, and/or orthogonal signal 2 and electrical signal 4, that have been determined to be correlated. In another example, de-skewing device 130 may continue to process the signals based on a determination that another quantity of values associated with a quantity of skew, which are stored in the second memory, is less than another threshold. The quantity of values, as described above, may correspond to the second pair of signals, such as reference signal 1 and electrical signal 3, and/or orthogonal signal 2 and electrical signal 4, that have been determined to be correlated.

When continuing to process the signals, de-skewing device 130 may, in a manner similar to that described above with respect to block 510, detect one or more of the electrical signals, received from optical receiver 120, via the channels corresponding to electrical paths 150. Each of the one or more electrical signals may be processed, in a manner similar to that described above (e.g., with respect to blocks 515-540) to identify which of the electrical signals are correlated.

As also shown in FIG. 5A, if the signals are not to continue to be processed (block 545—NO), then process 500 may include generating one or more average skew values based on the values associated with the quantities of skew stored in the first and/or second memory (block 555 of FIG. 5B). For example, de-skewing device 130 may not continue to process the signals based on a determination that the quantity of values associated with quantities of skew, that are stored in the first memory, is not less than the threshold. In another example, de-skewing device 130 may not continue to process the signals based on a determination that the other quantity of values associated with the quantities of skew, that are stored in the second memory, is not less than the other threshold.

Based on the determination that the signals are not to continue to be processed, de-skewing device 130 may generate one or more average skew values, associated with the one or more signals, based on the values associated with the quantities of skew that are stored in the first and second memories. For example, de-skewing device 130 may generate a first average skew value (e.g., $D'_{13}$) based on an average of values associated with the first quantity of skew (e.g., $D_{13}$) that are stored in the first memory. De-skewing device 130 may generate a second average skew value (e.g., $D'_{14}$) based on an average of values associated with the second quantity of skew (e.g., $D_{14}$) that are stored in the second memory. De-skewing device 130 may generate a third average skew value (e.g., $D'_{23}$) based on an average of values associated with the third quantity of skew (e.g., $D_{23}$) that are stored in the second memory. De-skewing device 130 may generate a fourth average skew value (e.g., $D'_{24}$) based on an average of values associated with the fourth quantity of skew (e.g., $D_{24}$) that are stored in the first memory.

In another example implementation, de-skewing device 130 may generate mean skew values instead of, or in addition to, the average skew values. The mean skew values may be based on an average of values associated with the quantities of skew that are stored in the first and/or second memories. In yet another example implementation, de-skewing device 130 may generate median skew values instead of, or in addition to, the average skew values and/or the mean skew values. The median skew values may be based on determining a median of the values associated with the quantities of skew that are stored in the first and/or second memories.

When determining the average skew values, de-skewing device 130 may eliminate one or more values, associated with quantities of skew, that are substantially greater than or less than an average quantity of skew. For example, de-skewing device 130 may discard a value, associated with a quantity of skew, that is greater than or less than an average quantity of skew by more than a threshold. The threshold may be based on a portion of the average, one or more standard deviations relative to the average, etc.

As further shown in FIG. 5B, process 500 may include generating de-skew values for the one or more channels based on the average skew values (block 560) and processing the signals based the de-skew values (block 565). For example, de-skewing device 130 may set a first average de-skew value (e.g., $D_1$), corresponding to reference channel one, to be approximately equal to a quantity (e.g., $D_1 \cong 0$ or some other quantity) that is predetermined by de-skewing device 130 and/or specified by an operator of de-skewing device 130. De-skewing device 130 may, in another example, set a third de-skew value (e.g., $D_3$), corresponding to the channel three, to be approximately equal to the third average skew value (e.g., $D_3 \cong D'_{13}$). De-skewing device 130 may, in yet another example, set a fourth de-skew value (e.g., $D_4$), corresponding to channel four, to be approximately equal to the fourth average skew value (e.g., $D_4 \cong D'_{14}$).

In a further example, de-skewing device 130 may determine a second skew value (e.g., $D_2$), corresponding to channel two, in an indirect manner. The second skew value may be determine indirectly based on channel two being orthogonal and/or independent to channel one. Stated differently, determining the second skew value in a direct manner, such as by measuring a quantity of skew between channel one and/or channel two (e.g., $D_{12}$) may yield an anomalous and/or incorrect result. Thus, de-skewing device 130 may generate the second skew value, in the indirect manner, based on the first average quantity of skew (e.g., $D'_{13}$), the second average quantity of skew (e.g., $D'_{14}$), the third average quantity of skew (e.g., $D'_{23}$), and/or the fourth average quantity of skew (e.g., $D'_{24}$). For example, de-skewing device 130 may generate the second de-skew value based on one-half of a quantity defined by a sum of the first and second skew values minus another sum of the third and fourth skew values (e.g., $D_2 = ((D_{13}+D_{14})-(D_{23}+D_{24}))/2$).

De-skew processor 360 may transmit the de-skew values to optical receiver 120, which may allow optical receiver 120 to reduce or eliminate skew associated with each channel based on the de-skew values. Optical receiver 120 may, for example, receive the de-skew values and may introduce delay into one or more of the channels in a manner that corresponds to the de-skew values.

Systems and/or methods, described herein, may enable a de-skewing device to determine one or more quantities of skew between channels of a coherent optical receiver based on a difference in arrival times between signals relative to a reference signal or another signal that is orthogonal to the reference signal.

The systems and/or methods may enable a de-skewing device to use the one or more quantities of skew to generate de-skew values that can be used, by the optical receiver, to reduce the skew between the channels of the optical receiver. Reducing the skew, between the channels of the optical receiver, may result in an increase in performance of the optical receiver.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 5A and 5B, the order of the blocks may be changed in other implementations. Also, non-dependent blocks may be performed in parallel.

Furthermore, while the embodiments disclosed have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementation includes each dependent claim in combination with every other claim in the claim set.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:

receiving a plurality of electrical signals from an optical receiver and via a plurality of channels;

identifying a first signal, of the plurality of electrical signals, as a reference signal that is received via a first channel of the plurality of channels;

identifying a second signal, of the plurality electrical signals, as an orthogonal signal that is received via a second channel, of the plurality of channels, where the second signal is orthogonal to the first signal;

measuring a plurality of skew values based on a difference in arrival times between one or more other electrical signals, of the plurality of electrical signals, and the reference signal or the orthogonal signal;

generating a plurality of de-skew values based on at least a portion of the plurality of skew values; and transmitting the plurality of de-skew values, to the optical receiver, where transmitting the plurality of de-skew values allows the optical receiver to de-skew signals on the plurality of channels where the plurality electrical signals are generated, by the optical receiver, as a result of processing an optical signal received from an optical transmitter, and where the optical signal has a scrambled polarization state, the scrambled polarization state including a polarization of the optical signal that changes as a function of time.

2. The method of claim 1, where the plurality of de-skew values include at least one of:

a first de-skew value, associated with the first channel, that is based on a predetermined value, a second de-skew value, associated with the second channel, that is based on the plurality of skew values, a third de-skew value, associated with a third channel of the plurality of channels, that is based on a skew value, of the plurality of skew values, between a third signal, of the one or more other electrical signals, and the reference signal, or a fourth de-skew value, associated with a fourth channel of the plurality of channels, that is based on another skew value, of the plurality of skew values, between a fourth signal, of the one or more other electrical signals, and the reference signal.

3. The method of claim 2, where the plurality electrical signals are generated, by an optical receiver, as a result of processing the optical signal received from an optical transmitter, and where the plurality of electrical signals include:

the reference signal that corresponds to a first polarization state and represents one of an imaginary component or a real component of a first portion of the optical signal, the orthogonal signal that corresponds to the first polarization state and represents another one of the imaginary component or the real component of the first portion of the optical signal, the third signal that corresponds to a second polarization state and represents one of the imaginary component or the real component of a second portion of the optical signal, where the second polarization state is orthogonal to the first polarization state, or a fourth signal that corresponds to the second polarization state and represents the other one of the imaginary component or the real component of the second portion of the optical signal.

4. The method of claim 1, further comprising:
up-sampling the plurality of electrical signals at a first sampling rate that is greater than a second sampling rate associated with the optical receiver.

5. The method of claim 1, where measuring the plurality of skew values further includes:
measuring a first arrival time associated with the reference signal or the orthogonal signal;
measuring a second arrival time associated with the third signal of the plurality of electrical signals; and
generating a skew value, of the plurality of skew values, based on a difference in arrival times between the first arrival time and the second arrival time.

6. The method of claim 1, where measuring the plurality of skew values further includes:
measuring a first skew value, of the plurality of skew values, based on a difference in arrival times between the reference signal and a third signal, of the plurality of electrical signals, received via a third channel;
measuring a second skew value, of the plurality of skew values, based on a difference in arrival times between the reference signal and a fourth signal, of the plurality of electrical signals, received via a fourth channel of the plurality of channels;
measuring a third skew value, of the plurality of skew values, based on a difference in arrival times between the orthogonal signal and the third signal; and
measuring a fourth skew value, of the plurality of skew values, based on a difference in arrival times between the orthogonal signal and the fourth signal.

7. The method of claim 6, where generating the plurality of de-skew values further includes:
generating a second de-skew value based on one-half of a quantity defined by a first sum of the first skew value and the second skew value minus a second sum of the third skew value and fourth skew value.

8. The method of claim 1, further comprising:
determining that the reference signal and a third signal, of the one or more other electrical signals are correlated when a first correlation value, associated with the reference signal and the third signal is greater than a second correlation value associated with the reference signal and a fourth signal of the one or more other electrical signals,
where the first correlation value is a measure of a maximum quantity of correlation between the reference signal and the third signal, and
where the second correlation value is a measure of a maximum quantity of correlation between the reference signal and the fourth signal; and
determining that the reference signal and the fourth signal are correlated when the first correlation value is not greater than the second correlation value.

9. The method of claim 8, further comprising:
determining that the orthogonal signal and the fourth signal are correlated based on a determination that the reference signal and the third signal are correlated; and
storing, in a memory associated with the device, a first skew value of the plurality of skew values and a second skew value, of the plurality of skew values, based on a determination that the reference signal and the third signal, and the orthogonal signal and the fourth signal are correlated:
where the first skew value corresponds to a difference in arrival times between the reference signal and the third signal, and
where the second skew value corresponds to another difference in arrival times between the orthogonal signal and the fourth signal.

10. The method of claim 8, further comprising:
determining that the orthogonal signal and the third signal are correlated based on a determination that the reference signal and the fourth signal are correlated,
storing, in a memory associated with the device, a first skew value, of the plurality of skew values, and a second skew value, of the plurality of skew values, based on a determination that the reference signal and the fourth signal, and the orthogonal signal and the third signal are correlated:
where the first skew value corresponds to a difference in arrival times between the reference signal and the fourth signal, and
where the second skew value corresponds to another difference in arrival times between the orthogonal signal and the third signal.

11. The method of claim 1, where the plurality of signals are up-sampled at a first sampling rate that is greater than a second sampling rate at which the plurality of signals were sampled by the optical receiver; and
where measuring the plurality of skew values further includes:
generating a skew value, of the plurality of skew values, based on an average of a first difference in arrival times and a second difference in arrival times between a third signal and the reference signal,
where the first difference in arrival times is associated with the third signal and the reference signal that are up-sampled at the first sampling rate, and
where the second difference in arrival times is associated with the third signal and the reference signal that have been previously up-sampled at a third sampling rate that is greater than the second sampling rate and is different than the first sampling rate.

12. A device comprising:
one or more processors to:
receive a plurality of signals, from an optical receiver, via a plurality of channels,
identify that a first signal, of the plurality of signals, is received via a first channel of the plurality of channels;
identify that a second signal, of the plurality electrical signals, is received via a second channel, of the plurality of channels, where the second signal is orthogonal to the first signal;
measure a plurality of skew values based on a difference in arrival times between one or more other signals of the plurality of signals and the first signal or the second signal;
generate a plurality of average skew values based on at least a portion of the plurality of skew values and at least a portion of a previously-measured plurality of skew values,
generate a plurality of de-skew values based on the plurality of average skew values, and
transmit the plurality of de-skew values to the optical receiver, where transmitting the plurality of de-skew values allows the optical receiver to de-skew the plurality of signals, where the plurality signals are generated, by the optical receiver, as a result of processing an optical signal received from an optical transmitter, and where the optical signal has a scrambled polarization state, the scrambled polarization state including a polarization of the optical signal that changes as a function of time.

13. The device of claim 12, where the plurality of average skew values correspond to at least one of:
   a first de-skew value, associated with the first channel, that is based on a predetermined value,
   a second de-skew value, associated with the second channel, that is based on the plurality of average skew values,
   a third de-skew value, associated with a third channel of the plurality of channels, that is based on an average skew value, of the plurality of average skew values, between a third signal, of the plurality of signals, and the first signal, or
   a fourth de-skew value, associated with a fourth channel of the plurality of channels, that is based on another average skew value, of the plurality of average skew values, between a fourth signal, of the plurality of signals, and the first signal.

14. The device of claim 12, where, when generating the plurality of average skew values, the one or more processors are further to:
   determine whether a first correlation value is greater than a second correlation value,
   where the first correlation value is a measure of a maximum quantity of correlation between the first signal and a third signal, of the plurality of signals, and
   where the second correlation value is a measure of a maximum quantity of correlation between the first signal and a fourth signal, of the plurality of signals,
      generate an average first skew value, of the plurality of average skew values, using a first skew value and one or more other first skew values, of at least the portion of the previously-measured plurality of skew values, based on a determination that the first correlation value is greater than the second correlation value,
   where the first skew value is based on a difference in arrival times between a third signal, of the plurality of signals, and the first signal.

15. The device of claim 14, where, when generating the plurality of average skew values, the one or more processors are further to:
   determine that the first channel and a third channel, via which the third signal is received, are correlated, and that the second channel and a fourth channel, via which the fourth signal is received, are correlated based on a determination that the first correlation value is greater than the second correlation value, and
   determine that the first channel and the fourth channel are correlated and that the second channel and the third channel are correlated based on a determination that the first correlation value is not greater than the second correlation value.

16. The device of claim 14, where, when generating the plurality of average skew values, the one or more processors are further to:
   generate an average second skew value using a second skew value and one or more other second skew values, of at least the portion of previously-measured plurality of skew values, based on a determination that the first correlation value is greater than the second correlation value,
   where the second skew value is based on a difference in arrival times between the fourth signal and the second signal.

17. The device of claim 14, where, when generating the plurality of average skew values, the one or more processors are further to:
   generate an average second skew value, of the plurality of average skew values, using a second skew value and one or more other second skew values, of at least the portion of the previously-measured plurality of skew values, based on a determination that the first correlation value is not greater than the second correlation value,
   where the second skew value is based on a difference in arrival times between a fourth signal, of the plurality of signals, and the first signal,
   generate an average third skew value using a third skew value and one or more other third skew values, of at least the portion of the previously-measured plurality of skew values, based on a determination that the first correlation value is not greater than the second correlation value,
   where the third skew value is based on a difference in arrival times between the third signal and the second signal.

18. A system comprising:
   a de-skewing device to:
   receive a plurality of electrical signals via a plurality of channels,
   identify that a first signal, of the plurality of electrical signals, as a reference signal, is received via a first channel of the plurality of channels,
   identify that a second signal, of the plurality of electrical signals, is received via a second channel, of the plurality of channels, where the second signal is orthogonal to the first signal,
   generate one or more skew values that correspond to differences in arrival times between one or more other signals, of the plurality of electrical signals, and the first signal or the second signal,
   generate one or more de-skew values, associated with the plurality of channels, based on the one or more skew values and another one or more skew values that were previously generated, and
   output the one or more de-skew values; and
      an optical receiver to:
         receive the one or more de-skew values from the de-skewing device,
         de-skew the plurality of channels using the one or more de-skew values,
         receive an optical signal from an optical transmitter and via an optical path, where the optical signal is associated with a scrambled polarization state,
         process the optical signal to generate the plurality of electrical signals, and
         output the plurality of electrical signals via the plurality of channels.

19. The system of claim 18, where the one or more de-skew values include at least one of:
   a first de-skew value, associated with the first channel, that is based on a predetermined value,
   a second de-skew value, associated with the second channel, that is based on the one or more skew values and the other one or more skew values that were previously generated,
   a third de-skew value, associated with a third channel of the plurality of channels, that is based on a first skew value, of the one or more skew values, associated with a third signal, of the one or more other signals, and the first signal, and one or more other first skew values obtained from the other one or more skew values that were previously generated, or a fourth de-skew value, associated with a fourth channel of the one or more channels, that is based on a second skew value, of the one or more skew values, associated with a fourth signal, of the one or more other signals, and the first signal, and one or more other second skew values obtained from the other one or more skew values that were previously generated.

20. The system of claim 18, where the de-skewing device is further to:

measure a first arrival time associated with the first signal, measure a second arrival time associated with a third signal, of the plurality of signals, received via a third channel of the plurality of channels, and generate a first skew value, of the one or more skew values, based on a difference in arrival times between the first arrival time and the second arrival time.

21. The system of claim 18, where the de-skewing device is further to:

generate a first correlation value, of a plurality of first correlation values, based on a sum of a series of values obtained by multiplying the first signal by a delayed version of a third signal, of the plurality of electrical signals, the delayed version of the third signal being delayed, relative to the first signal, by a quantity of delay, determine that the first correlation value is greater than the other first correlation values of the plurality of first correlation values, where the other first correlation values are based on the first signal and other delayed versions of the third signal, where each of the other delayed versions of the third signal are delayed, relative to the first signal, by respective different quantities of delay, generate a second correlation value, of a plurality of second correlation values, based on a sum of another series of values obtained by multiplying the first signal by a delayed version of a fourth signal, of the plurality of electrical signals, the delayed version of the fourth signal being delayed, relative to the first signal, by another quantity of delay, and determine that the second correlation value is greater than the other second correlation values of the plurality of second correlation values, where the other second correlation values are based on the first signal and other delayed versions of the fourth signal, where each of the other delayed versions of the fourth signal are delayed, relative to the first signal, by other respective different quantities of delay.

22. The system of claim 21, where the de-skewing device is further to:

determine that the first channel and the fourth channel are correlated based on a determination that the second correlation value is greater than the first correlation value, store a first skew value, of the one or more skew values, based on the determination that the first channel and the fourth channel are correlated, where the first skew value is based on a difference in arrival times between a the second signal and the fourth signal, determine that the second channel and the third channel are correlated based on the determination that the first channel and the fourth channel are correlated, and store a second skew value, of the one or more skew values, based on the determination that the second channel and the third channel are correlated, where the second skew value is based on another difference in arrival times between a the second signal and the third signal.

23. The system of claim 21, where the de-skewing device is further to:

obtain one or more second skew values, from the other one or more skew values that were previously generated based on the determination that the second correlation value is greater than the first correlation value, and generate a second de-skew value, of the one or more de-skew values, based on an average of the second skew value and the one or more second skew values obtained from the other one or more skew values.

* * * * *